(12) United States Patent
Pan et al.

(10) Patent No.: US 11,663,913 B2
(45) Date of Patent: May 30, 2023

(54) NEURAL NETWORK WITH LANE AGGREGATION FOR LANE SELECTION PREDICTION OF MOVING OBJECTS DURING AUTONOMOUS DRIVING

(71) Applicant: Baidu USA LLC, Sunnyvale, CA (US)

(72) Inventors: Jiacheng Pan, Sunnyvale, CA (US); Kecheng Xu, Sunnyvale, CA (US); Hongyi Sun, Sunnyvale, CA (US); Yajia Zhang, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 211 days.

(21) Appl. No.: 16/458,999

(22) Filed: Jul. 1, 2019

(65) Prior Publication Data

US 2021/0001843 A1 Jan. 7, 2021

(51) Int. Cl.
*B60W 30/095* (2012.01)
*G08G 1/16* (2006.01)
*G06K 9/00* (2022.01)
*G05D 1/02* (2020.01)
*G06N 3/08* (2023.01)
(Continued)

(52) U.S. Cl.
CPC ....... *B60W 30/0956* (2013.01); *G05D 1/0221* (2013.01); *G06N 3/08* (2013.01); *G06V 20/58* (2022.01); *G06V 20/588* (2022.01); *G08G 1/167* (2013.01); *G05D 2201/0213* (2013.01)

(58) Field of Classification Search
CPC .............. B60W 30/0956; G08G 1/167; G08G 1/096775; G06K 9/00798; G06K 9/00805; G06K 9/6281; G05D 1/0221; G05D 2201/0213; G05D 1/0236; G05D 1/024; G05D 1/0242; G05D 1/0246; G05D 1/0257; G05D 1/0223; G05D 1/0214; G05D 1/0278; G05D 1/0276; G06N 3/08

See application file for complete search history.

(56) References Cited

U.S. PATENT DOCUMENTS

2020/0174490 A1* 6/2020 Ogale .................. G05D 1/0221
2020/0180647 A1* 6/2020 Anthony ................ G06V 20/56
2020/0249674 A1* 8/2020 Dally ...................... G06N 3/08
(Continued)

OTHER PUBLICATIONS

Marques et al (Tracking of Moving Objects With Multiple Models Using Gaussian Mixtures) (Year: 1999).*

*Primary Examiner* — Nga X Nguyen
(74) *Attorney, Agent, or Firm* — Womble Bond Dickinson (US) LLP

(57) ABSTRACT

In one embodiment, an autonomous driving system of an ADV perceives a driving environment surrounding the ADV based on sensor data obtained from various sensors, including detecting one or more lanes and at least a moving obstacle or moving object. For each of the lanes identified, an NN lane feature encoder is applied to the lane information of the lane to extract a set of lane features. For a given moving obstacle, an NN obstacle feature encoder is applied to the obstacle information of the obstacle to extract a set of obstacle features. Thereafter, a lane selection predictive model is applied to the lane features of each lane and the obstacle features of the moving obstacle to predict which of the lanes the moving obstacle intends to select.

20 Claims, 10 Drawing Sheets

(51) Int. Cl.
*G06V 20/58* (2022.01)
*G06V 20/56* (2022.01)

(56) References Cited

U.S. PATENT DOCUMENTS

2020/0249684 A1* 8/2020 Onofrio ............... G05D 1/0088
2020/0341466 A1* 10/2020 Pham ....................... G06N 3/04

* cited by examiner

NEURAL NETWORK WITH LANE AGGREGATION FOR LANE SELECTION PREDICTION OF MOVING OBJECTS DURING AUTONOMOUS DRIVING

TECHNICAL FIELD

Embodiments of the present disclosure relate generally to operating autonomous vehicles. More particularly, embodiments of the disclosure relate to a lane selection prediction of moving obstacles during autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A successful autonomous driving system needs to be able to have a good comprehension of the surrounding environment. It should be able to predict the intention and/or future trajectory of surrounding obstacles, and take that into consideration for planning its own moving trajectory.

In predicting a future movement of an obstacle, a predictive model has been utilized to predict the future lane-selection of the obstacle. However, such a model only focuses on the obstacle's motion history and a single lane, and predicts the probability of the obstacle selecting the given lane in the future. However, it does not take into consideration of the entire environment. Also, when extracting lane-features, it only looks at lane features in the forward direction, but doesn't look backwardly. As a result, the prediction may not be accurate.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
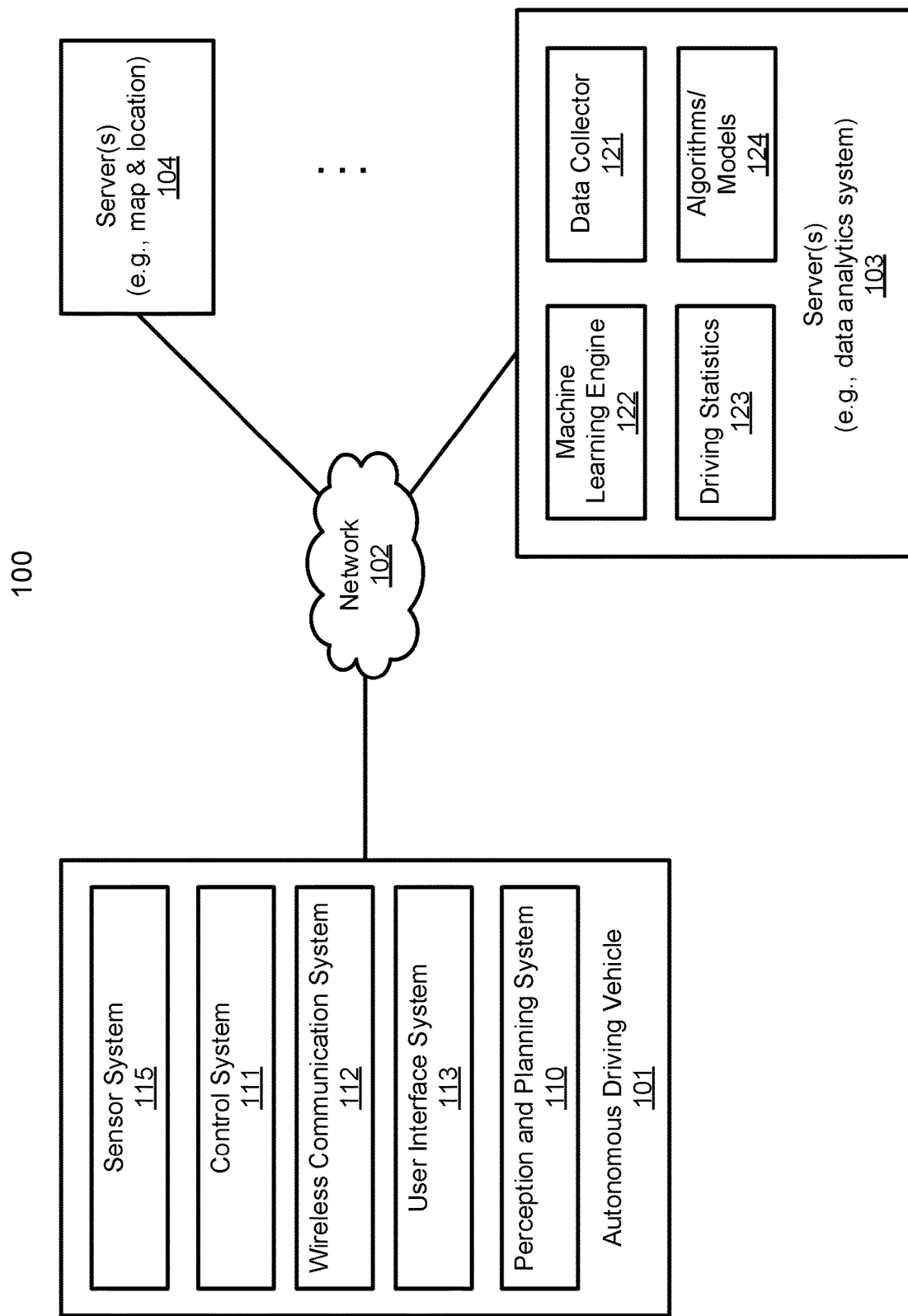
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a neural network (NN) predictive system is utilized to predict the lane selection of an obstacle (e.g., vehicle). The system not only uses each single lane's feature, but also aggregates all surrounding lane features together. It adds to the existing extracted features of obstacle motion history and lane of interests, and introduces another domain of extracted features of all surrounding road environment. This new dimension of features can make the prediction more precise and intelligent than the conventional systems.

For a given obstacle, according to certain embodiments, input features are obstacle itself (with motion history), forward lane features (shape, lane-point positions), and backward lane features. There are three feature encoders which extract the three types of features respectively and encode them. Typically, LSTM (long short term memory) or GRU (gated recurrent unit) can be used for the encoders. Temporal CNN (convolutional neural network) or MLP (multilayer perception) can also be used. Once the obstacle features are encoded, it can be used as an input to the lane-encoder to provide attention score and let the lane-encoder focus on the important lane-points. Once we have all the forward and backward encodings, they can be passed through an aggregating module to form an aggregated encoding. The further encoding is usually an MLP processing module. The aggregation is usually a symmetric function—max pooling or average pooling, etc. Finally, we have forward and backward lane encodings unique to each lane, and obstacle encoding and aggregated encoding that are the same for all lanes. All features can be concatenated together, pass it through the MLP and softmax to calculate a probability for each lane. That is the probability of the vehicle selecting the corresponding lane in the future (e.g., approximately 3 seconds).

According to one embodiment, an autonomous driving system of an ADV perceives a driving environment surrounding the ADV based on sensor data obtained from various sensors, including detecting one or more lanes and at least a moving obstacle or moving object. For each of the lanes identified, an NN lane feature encoder is applied to the lane information of the lane to extract a set of lane features. For a given moving obstacle, an NN obstacle feature encoder is applied to the obstacle information of the obstacle to extract a set of obstacle features. Thereafter, a lane selection predictive model is applied to the lane features of each lane and the obstacle features of the moving obstacle to predict which of the lanes the moving obstacle intends to select. In one embodiment, in addition to the individual lane features of the individual lane, the lane features are aggregated by applying an NN environment encoder to the individual lane features to generate a set of environment features (e.g., features representing the combination of all lanes). The lane selection predictive model is then applied to 1) individual lane features, 2) obstacle features, and 3) environment features.

In one embodiment, a first NN lane feature encoder extracts a first set of lane features of a first lane and a second NN lane feature encoder extracts a second set of lane features of a second lane. The first and second sets of lane features are fed to a first input and a second input of the lane selection predictive model. The first and second NN lane feature encoders may be the same NN encoders or different NN encoders. The lane selection predictive model generates a first output representing a probability of the first lane and a second output representing a probability of the second lane that may be selected by the moving obstacle.

In one embodiment, the lanes include at least one forward lane (e.g., a lane in front of the moving obstacle) and at least one backward lane (e.g., a lane behind the moving obstacle) with respective to a current location of the moving obstacle. The lane selection predictive model generates one or more outputs, one for each of the lanes identified representing a probability of the corresponding lane being selected by the moving obstacle. An NN lane feature encoder is applied to coordinates (x, y) of a lane center line of a lane. An NN obstacle feature encoder is applied to the coordinates of a moving history of the moving obstacle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
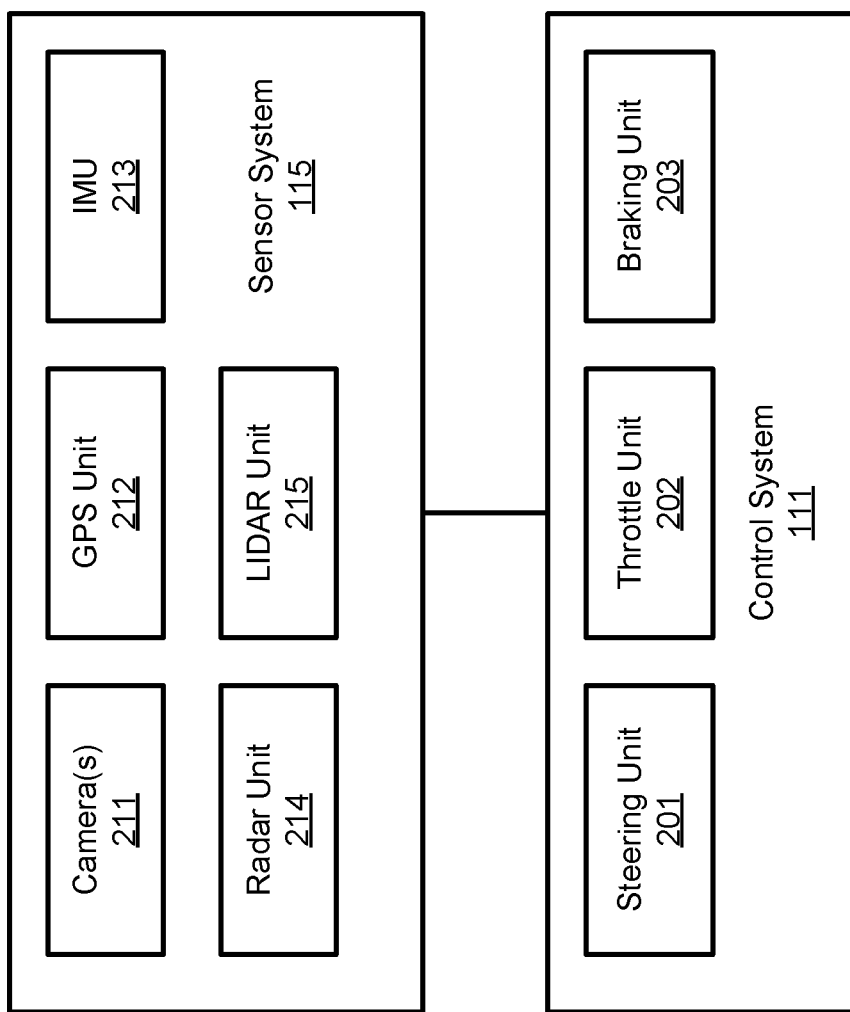
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a lane feature encoder, an obstacle feature encoder, and an environment feature encoder for lane selection prediction of obstacles. Algorithms 124 can then be uploaded on ADVs to be utilized during autonomous driving in real-time.

Figure 3A:
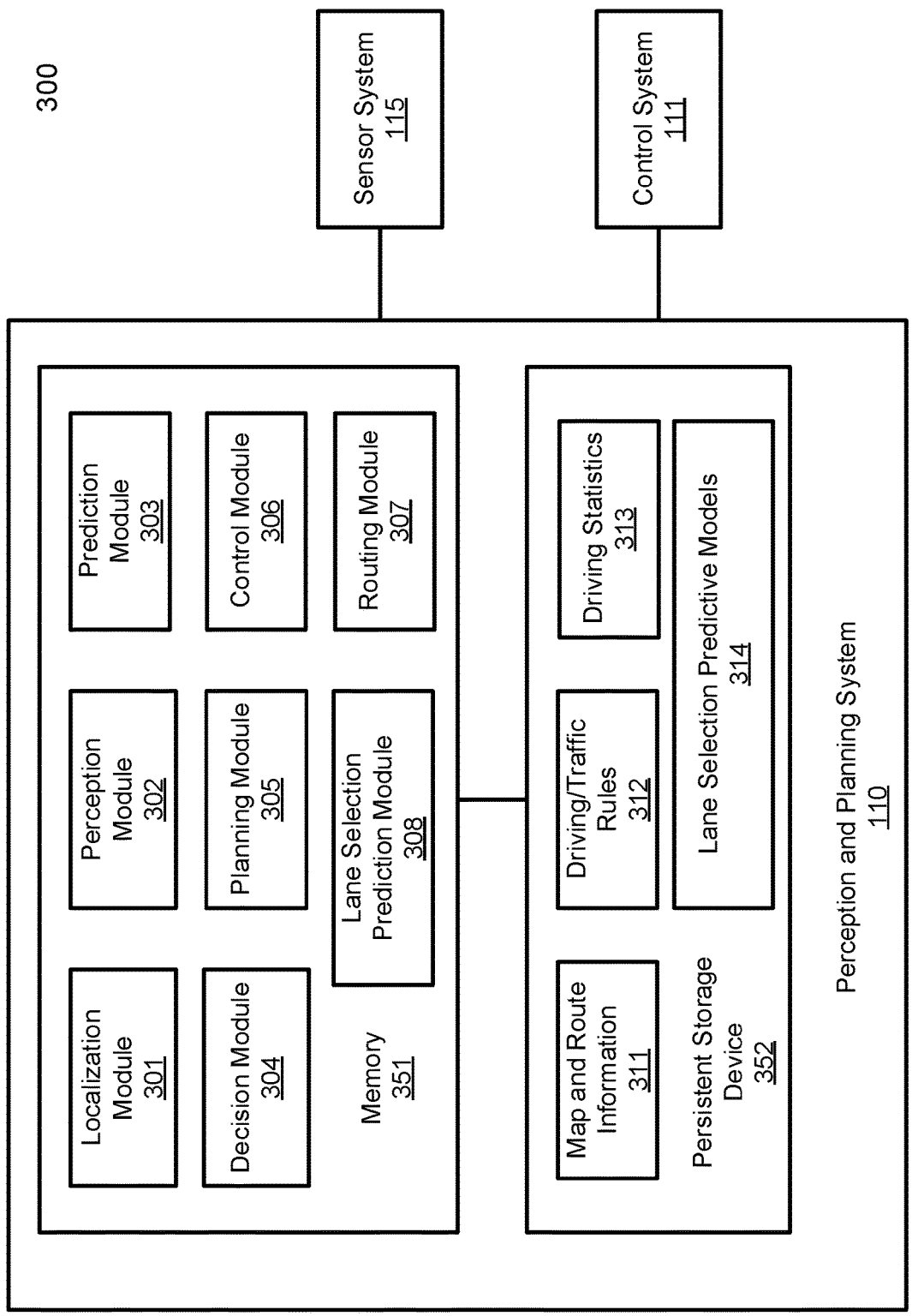
FIGS. 3A-3B are block diagrams illustrating an example of a perception and planning system used with an autonomous vehicle according to one embodiment.
Figure 3B:
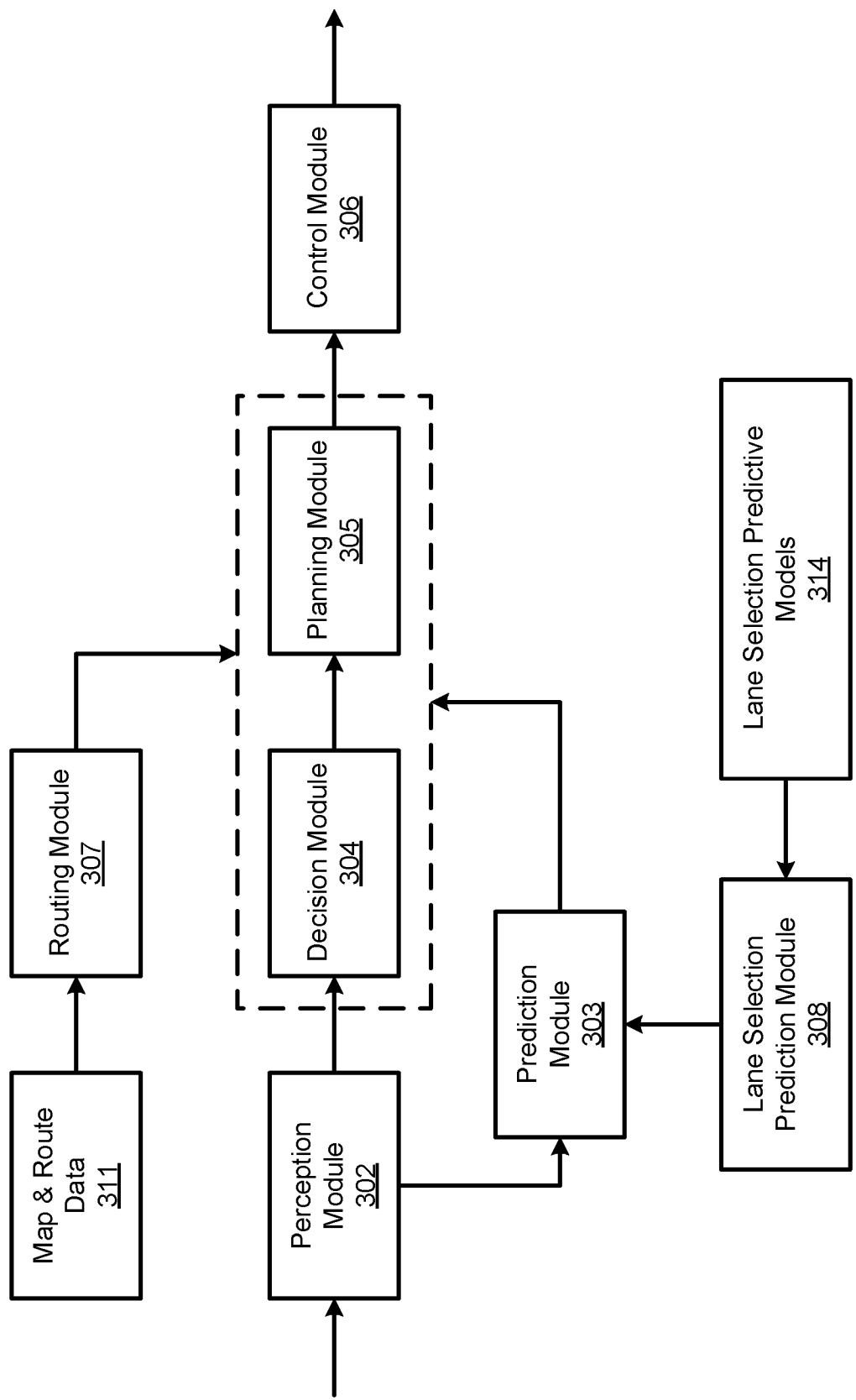

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and lane selection prediction module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The operational data such as perception results, prediction results, planning results, control results may be logged by a data logging module (not shown) and stored as part of driving statistics 313 in persistent storage device 352. The driving statistics 313 may include prediction of moving obstacles and actual moving of the obstacles, trajectories planned, control commands issued, and vehicles' responses at different points in time. Driving statistics 313 may be utilized for subsequent perception, prediction, and planning of the vehicle. Alternatively, driving statistics 313 may be analyzed offline for training purposes to improve the predictive models or driving algorithms.

According to one embodiment, lane selection predictive module 308 is configured to predict which of the lanes a moving obstacle will likely select based on the individual lane features, obstacle features of the moving obstacle, and environment features, using one or more NN feature encoders and/or predictive models 314. As a result, the prediction is made in view of entire driving environment, instead of only the individual lane features. The lane features include the features of a forward lane and a backward lane with respect to a location of the moving obstacle. The prediction of lane selection of the moving obstacle can be more accurate.

Figure 4A:
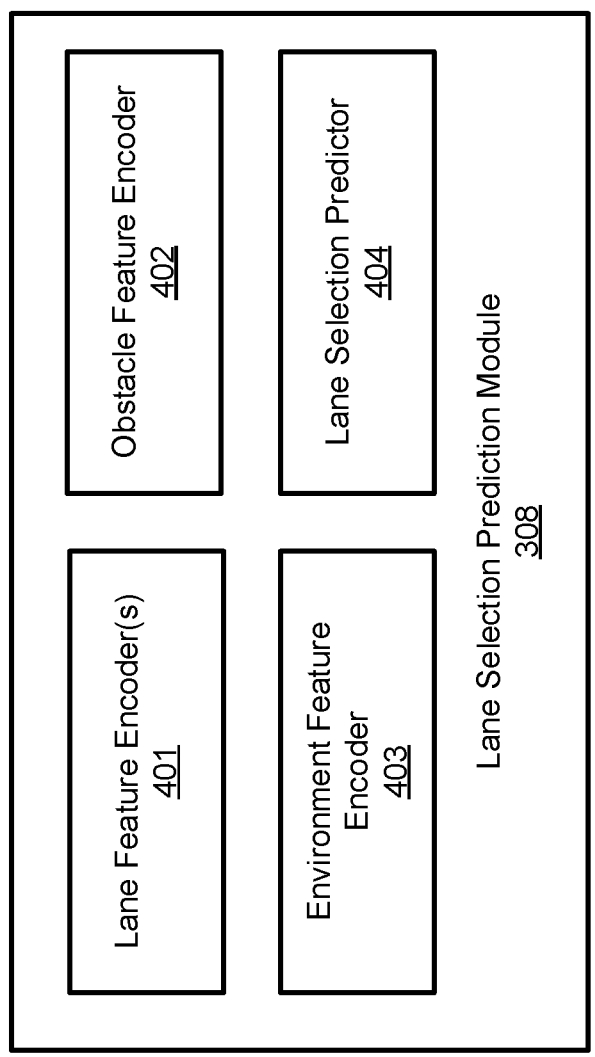
FIGS. 4A-4B are diagrams of a lane selection prediction system according to one embodiment.

FIG. 4A is a block diagram illustrating an example of a lane selection prediction module according to one embodiment. Referring to FIG. 4, in one embodiment, lane selection prediction module 308 includes one or more lane feature encoders 401, an obstacle feature encoder 402, an environment feature encoder 403, and a lane selection predictor 404.

Figure 4B:
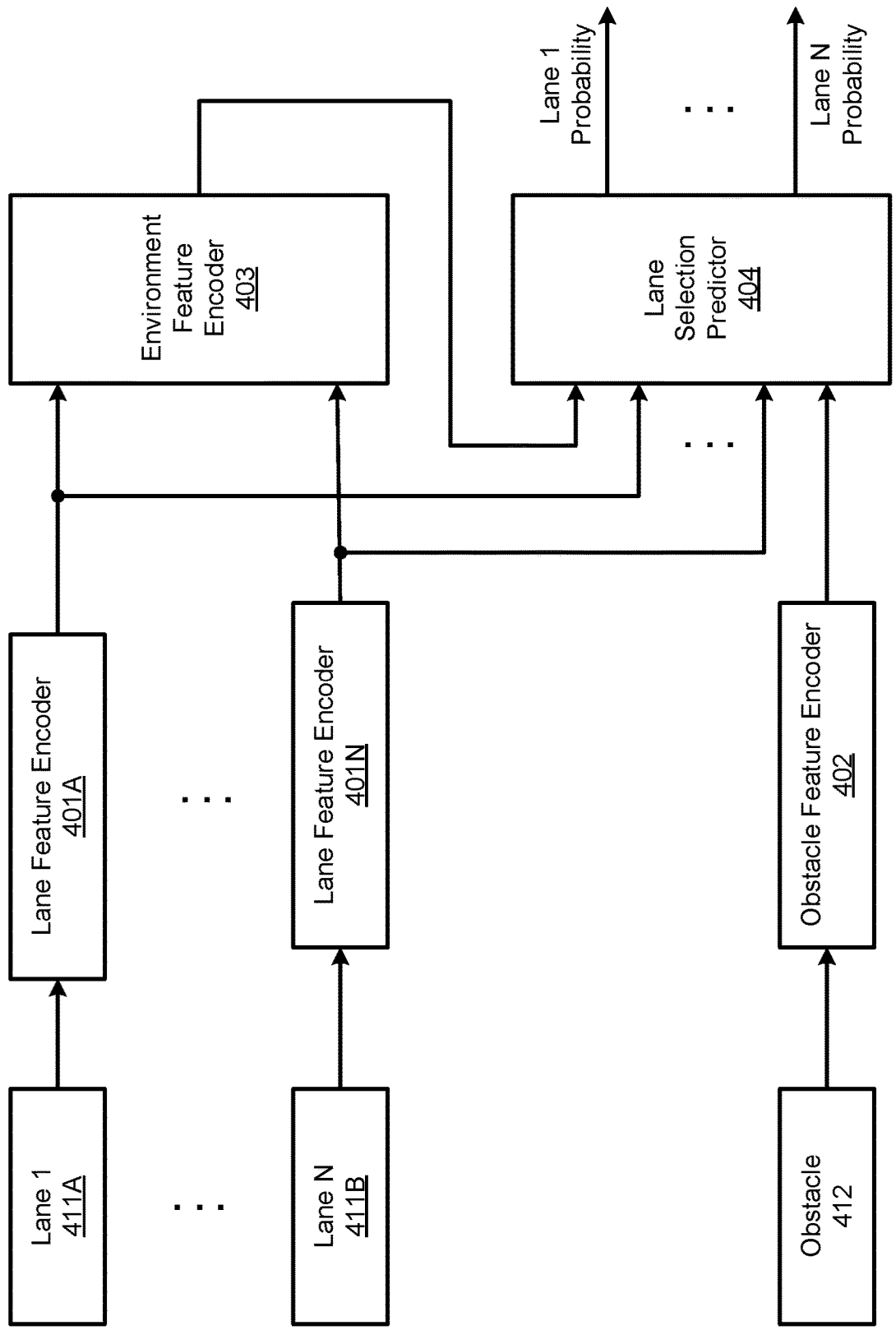

Referring now to FIG. 4B, which shows a lane selection prediction process performed by lane selection prediction module 308 of FIG. 4A. In this example, for each of the lanes 411A-411B (collectively referred to as lanes 411), a lane feature encoder (e.g., lane feature encoders 401A-401B, collectively referred to as lane feature encoders 401) is utilized to extract and encode the individual lane features of the corresponding lane. Each of the lane feature encoders 411A-411B may be a specific instance of the same lane feature encoder 401 or alternatively, lane feature encoders 411A-411B may be different types of feature encoders. In addition, for each of the moving obstacles, in this example, moving obstacle 412, obstacle feature encoder 402 is utilized to extract and encode a set of obstacle features. The lane features and the obstacle features generated from lane feature encoders 411 and obstacle feature encoder 402 are fed into lane selection predictor 404. In one embodiment, based on the lane features and the obstacle features, lane selection predictor 404 generates a lane prediction for each of the lanes 411A-411B in a form of a probability of which moving obstacle 412 will likely select and move into.

According to one embodiment, environment feature encoder 403 is utilized to aggregate the lane features extracted by lane feature encoders 401A-401B to generate a set of environment features. The environment features are also be fed into lane selection predictor 404. That is the lane selection predictor 404 is configured to predict the lane selection of obstacle 412 based on individual lane features provided by lane feature encoders 401A-401B, obstacle feature encoder 402, and environment features or aggregated lane features provided by environment feature encoder 403.

Figure 5A:
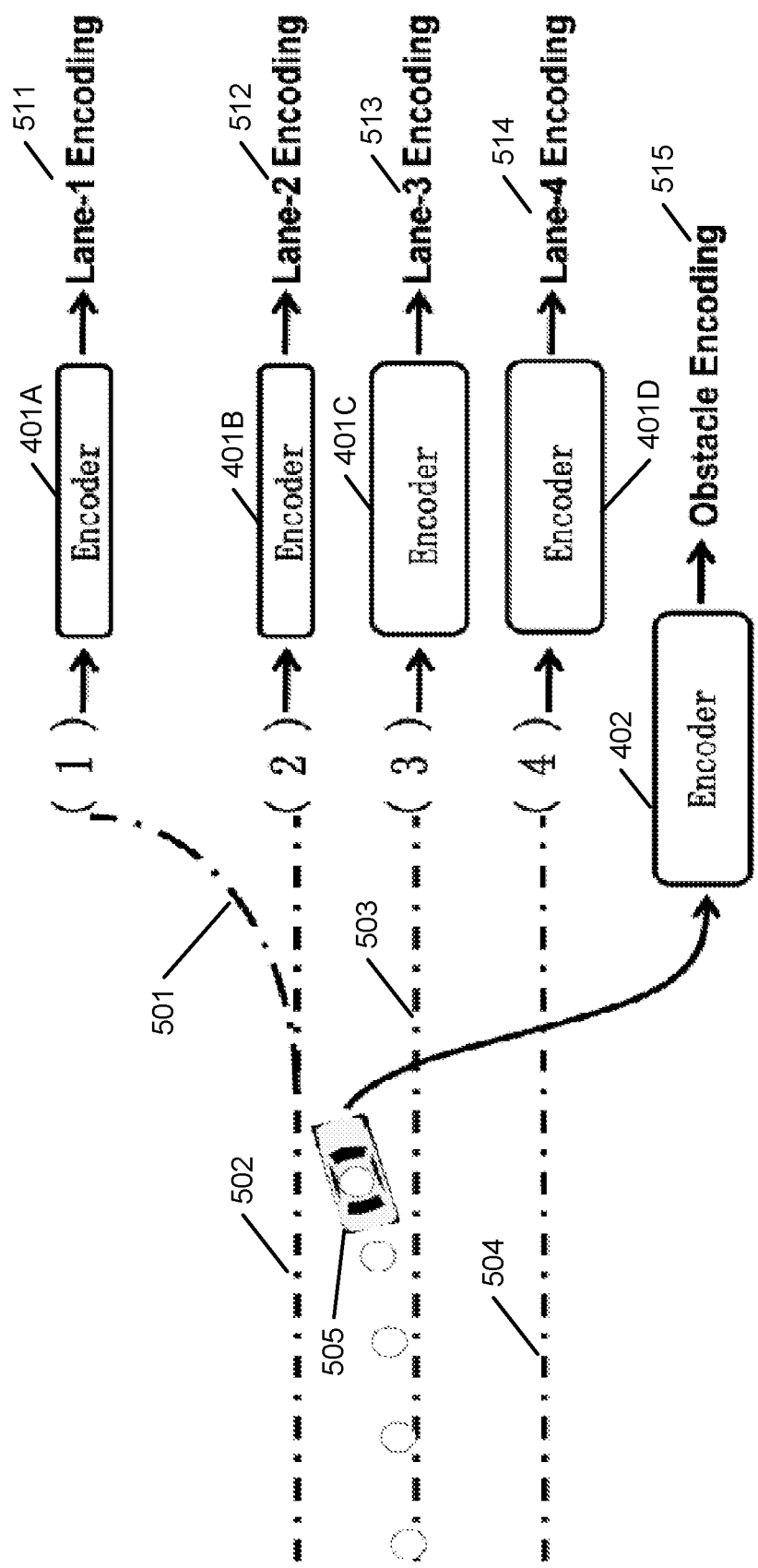
FIGS. 5A-5C are diagrams illustrating an example of a lane selection process according to one embodiment.
Figure 5B:
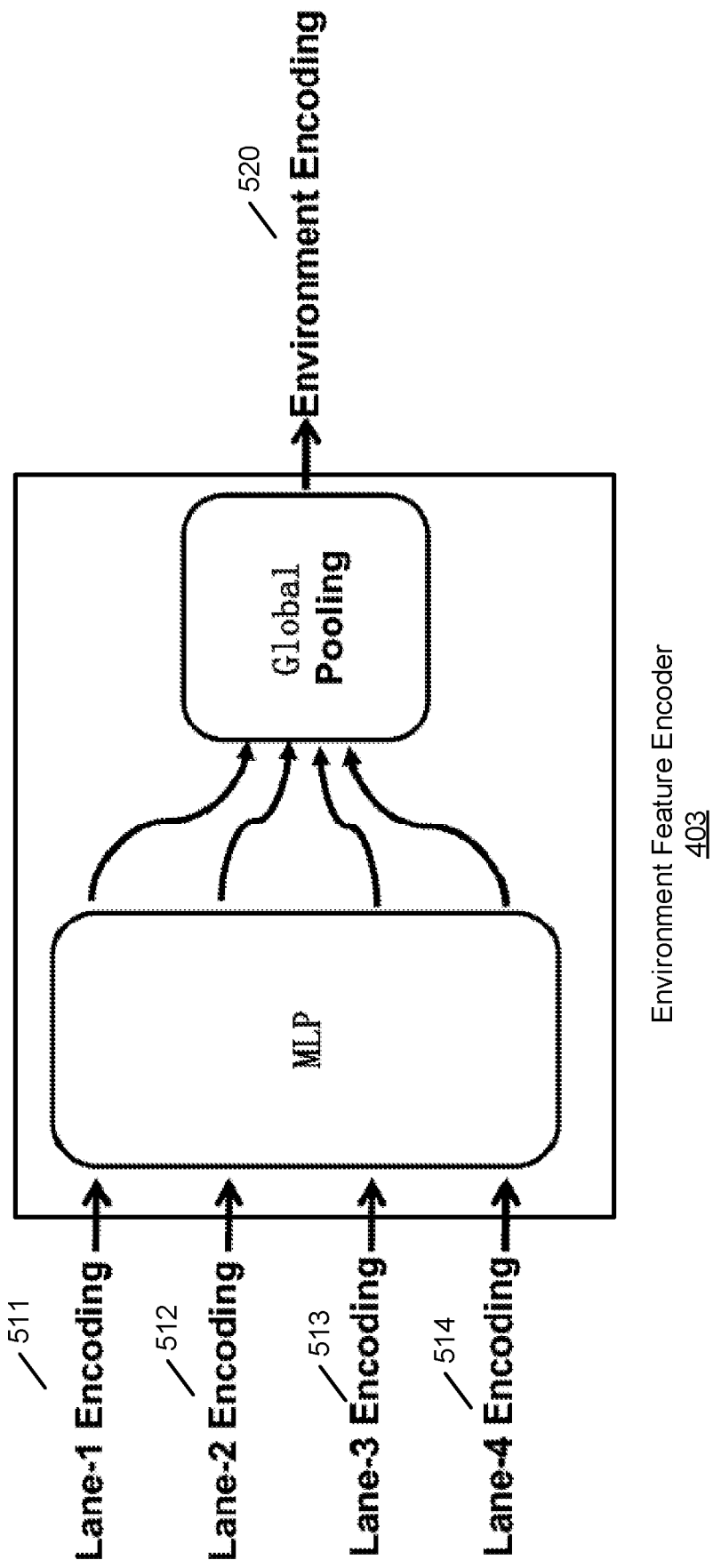
Figure 5C:
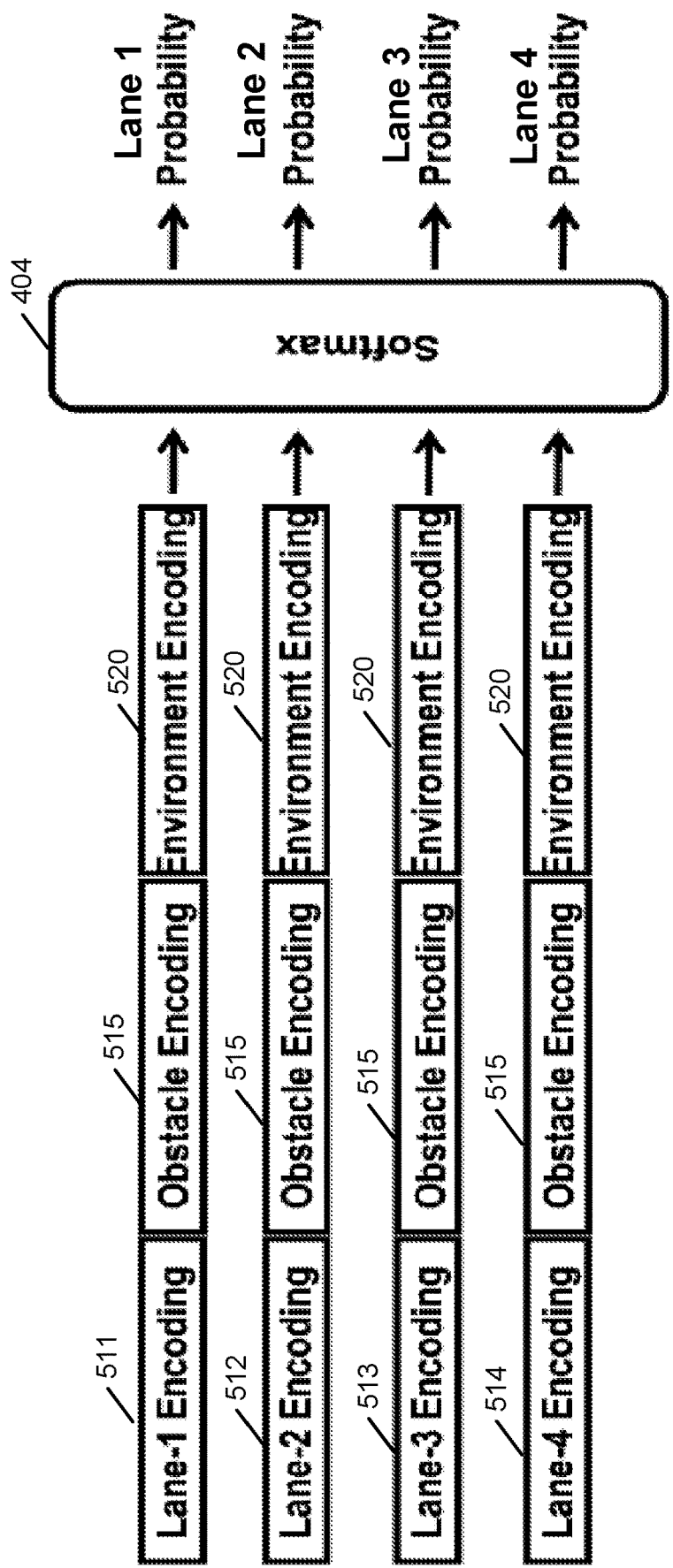

FIGS. 5A-5C show an example of a driving environment which can be utilized with an embodiment of the invention. Referring to FIG. 5A, in this example, there are four lanes represented by lane center lines 501-504. Moving obstacle 505 (e.g., a vehicle) is moving on lane 503, but it can stay in the current lane 503 or turn into any of lanes 501-502 and 504. According to one embodiment, the coordinates of lane center lines 501-504 are fed into the input of respective lane feature encoders 401A-401D, which generates corresponding sets of lane features 511-514 respectively. In addition, obstacle encoder is applied to the moving history of obstacle 505 (e.g., coordinates of past locations represented by the small circles), which generates a set of obstacle features 515.

Referring now to FIG. 5B, the lane features 511-514 are fed into environment feature encoder 403. In one embodiment, environment feature encoder 403 is a neural network that includes an MLP (multilayer perception) layer and a global average pooling layer. An MLP is a class of feedforward artificial neural network. An MLP consists of at least three layers of nodes: an input layer, a hidden layer, and an output layer. Except for the input nodes, each node is a neuron that uses a nonlinear activation function, MLP utilizes supervise learning technique called backpropagation for training. Its multiple layers and non-linear activation distinguish MLP from a linear perceptron. It can distinguish data that is not linearly separable, Global average pooling is an operation that calculates the average output of each feature map in the previous layer. The environment feature encoder 403 generates a set of environment features 520 based on lane features 511-514. The environment features are also referred to as aggregated lane features.

All of the lane features, obstacle features, and environment features are fed into lane selection predictor 404 as shown in FIG. 5C. In this example as shown in FIG. 5C, a softmax function is utilized as an example of lane selection predictor 404. Softmax is a function that takes as input a vector of K real numbers, and normalizes it into a probability distribution consisting of K probabilities. That is, prior to applying softmax, some vector components could be negative, or greater than one; and might not sum to 1; but after applying the softmax function, each component will be in the interval (0, 1), and the components will add up to 1, so that they can be interpreted as probabilities, Softmax is often used in neural networks to map the non-normalized output of a network to a probability distribution over predicted output classes.

According to one embodiment, a lane may be segmented into a forward lane portion and a backward lane portion based on the location of the obstacle. The lane portion in front of the obstacle is referred to as a forward lane while the lane portion behind the obstacle is referred to as a backward lane. A forward lane and a backward lane may be treated as separate lanes for the purpose of predicting lane selection. A separate lane feature encoder is utilized to encode the lane features of a forward lane and the lane features of a backward lane, even though they are associated with the same physical lane. As a result, the prediction takes into consideration of lane features behind the obstacle.

Figure 6:
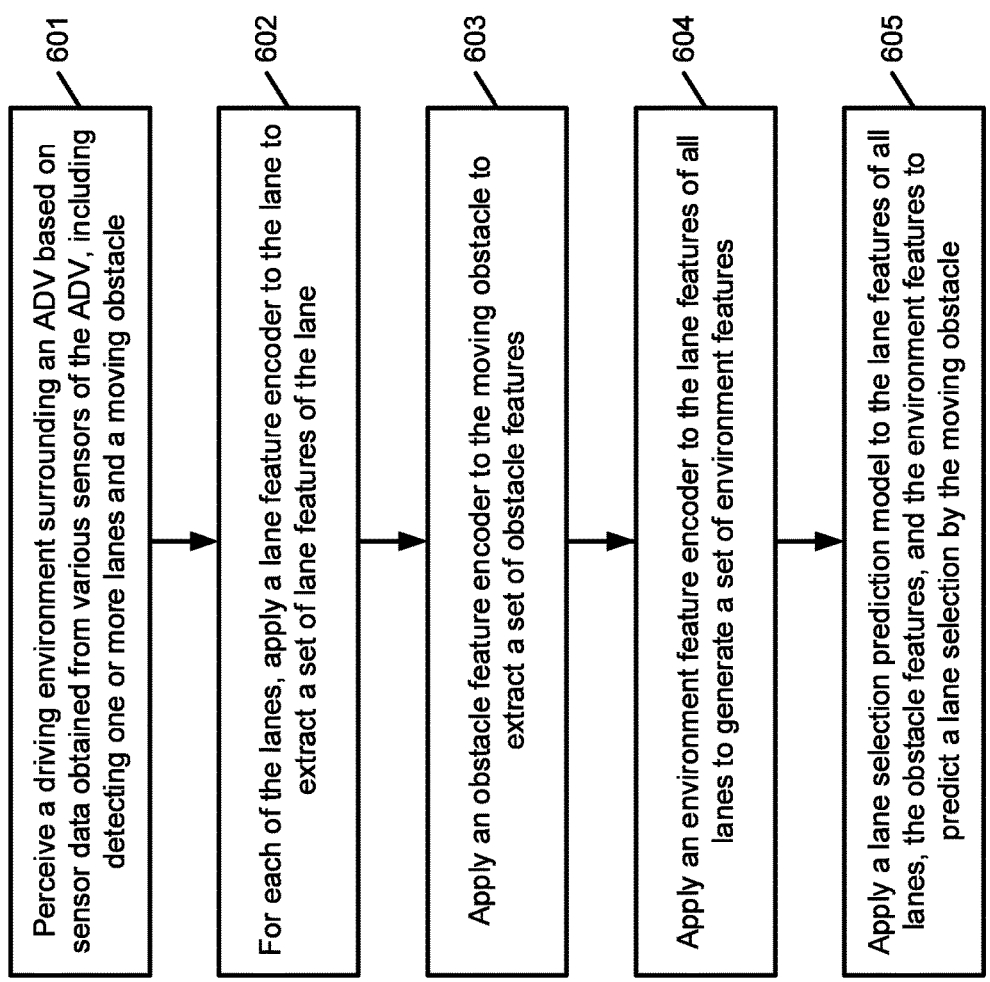
FIG. 6 is a flow diagram illustrating an example of a process of lane selection prediction according to one embodiment.

FIG. 6 is a flow diagram illustrating an example of a process of lane selection prediction according to one embodiment. Process 600 may be performed by processing logic which may include software, hardware, or a combination thereof. For example, process 600 may be performed by lane selection predictive module 308. Referring to FIG. 6, at block 601, processing logic perceives a driving environment surrounding an ADV based on sensor data obtained from various sensors of the ADV, including identifying or detecting one or more lanes and a moving obstacle. At block 602, for each of the lanes, a lane feature encoder is utilized to extract a set of lane features of the lane. At block 603, an obstacle feature encoder is utilized to extract a set of obstacle features of the moving obstacle. At block 604, an environment feature encoder is utilized to extract a set of environment features based on the lane features of the lanes extracted from the lane feature encoders. At block 605, a lane selection predictive model is utilized to predict the lane selection of the moving obstacle based on the lane features, the obstacle feature, and the environment features.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

perceiving a driving environment surrounding an ADV based on sensor data obtained from a plurality of sensors of the ADV, including identifying a plurality of lanes and a moving obstacle traveling in a first lane of the plurality of lanes;

for each of the plurality of lanes, applying a neural network (NN) lane feature encoder to the lane to extract a set of lane features, wherein the extracting performed on each of the plurality of lanes generates a plurality of sets of lane features that correspond to the plurality of lanes;

applying an NN obstacle feature encoder to the moving obstacle to extract a set of obstacle features of the moving obstacle;

applying an NN environment feature encoder to the plurality of sets of lane features to generate a set of environment features;

predicting a second lane of the plurality of lanes that the moving obstacle will select by applying a lane selection predictive model to the plurality of sets of lane features, the set of obstacle features of the moving obstacle, and the set of environmental features;

planning a path of the ADV, based on the predicting of the second lane that the moving obstacle will select, collision with the moving obstacle; and automatically operating a control system of the ADV to drive the ADV along the path.

2. The method of claim 1, wherein the lane selection predictive model produces the prediction of the second lane.

3. The method of claim 2, wherein the plurality of sets of lane features comprises:

a first set of lane feature corresponding to the first lane, the obstacle features, and the environment features; and a second set of lane feature corresponding to the second lane, the obstacle features, and the environment features, wherein the first set of lane features is fed to a first input of inputs of the lane selection predictive model and the second set of lane features is fed to a second input of the inputs.

4. The method of claim 3, wherein the lane selection predictive model generates a first output having a first probability and a second output having a second probability indicating probabilities of selecting the first lane and the second lane respectively by the moving obstacle.

5. The method of claim 1, wherein the plurality of lanes comprise one or more forward lanes and one or more backward lanes with respect to a current location of the moving obstacle.

6. The method of claim 1, wherein the lane selection predictive model generates one or more outputs, each output corresponding to one of the plurality of lanes, wherein each output includes a probability of the corresponding lane of which the moving obstacle will select.

7. The method of claim 1, wherein applying an NN lane feature encoder to a lane comprises feeding coordinates of a lane center line of the lane to an input of the NN lane feature encoder.

8. The method of claim 1, wherein applying an NN obstacle feature encoder to the moving obstacle comprises feeding coordinates of a moving history of the moving obstacle to an input of the NN obstacle feature encoder.

9. A non-transitory machine-readable medium having instructions stored therein, which when executed by a processor, cause the processor to perform operations, the operations comprising:

perceiving a driving environment surrounding an ADV based on sensor data obtained from a plurality of sensors of the ADV, including identifying a plurality of lanes and a moving obstacle traveling in a first lane of the plurality of lanes;

for each of the plurality of lanes, applying a neural network (NN) lane feature encoder to the lane to extract a set of lane features, wherein the extracting performed on each of the plurality of lanes generates a plurality of sets of lane features that correspond to the plurality of lanes;

applying an NN obstacle feature encoder to the moving obstacle to extract a set of obstacle features of the moving obstacle;

applying an NN environment feature encoder to the plurality of sets of lane features to generate a set of environment features;

predicting a second lane of the plurality of lanes that the moving obstacle will select by applying a lane selection predictive model to the plurality of sets of lane features, the set of obstacle features of the moving obstacle, and the set of environmental features;

planning a path of the ADV, based on the predicting of the second lane that the moving obstacle will select, to avoid collision with the moving obstacle; and automatically operating a control system of the ADV to drive the ADV along the path.

10. The machine-readable medium of claim 9, wherein the lane selection predictive model produces the predicting of the second lane.

11. The machine-readable medium of claim 10, wherein the plurality of sets of lane features s comprises:
a first set of lane feature corresponding to the first lane, the obstacle features, and the environment features; and
a second set of lane feature corresponding to the second lane, the obstacle features, and the environment features, wherein the first set of lane features is fed to a first input of inputs of the lane selection predictive model and the second set of lane features is fed to a second input of the inputs.

12. The machine-readable medium of claim 11, wherein the lane selection predictive model generates a first output having a first probability and a second output having a second probability indicating probabilities of selecting the first lane and the second lane respectively by the moving obstacle.

13. The machine-readable medium of claim 9, wherein the plurality of lanes comprise one or more forward lanes and one or more backward lanes with respect to a current location of the moving obstacle.

14. The machine-readable medium of claim 9, wherein the lane selection predictive model generates one or more outputs, each output corresponding to one of the plurality of lanes, wherein each output includes a probability of the corresponding lane of which the moving obstacle will select.

15. The machine-readable medium of claim 9, wherein applying an NN lane feature encoder to a lane comprises feeding coordinates of a lane center line of the lane to an input of the NN lane feature encoder.

16. The machine-readable medium of claim 9, wherein applying an NN obstacle feature encoder to the moving obstacle comprises feeding coordinates of a moving history of the moving obstacle to an input of the NN obstacle feature encoder.

17. A data processing system, comprising:
a processor; and
a memory coupled to the processor to store instructions, which when executed by the processor, cause the processor to perform operations, the operations comprising:
perceiving a driving environment surrounding an ADV based on sensor data obtained from a plurality of sensors of the ADV, including identifying a plurality of lanes and a moving obstacle traveling in a first lane of the plurality of lanes;
for each of the plurality of lanes, applying a neural network (NN) lane feature encoder to the lane to extract a set of lane features, wherein the extracting performed on each of the plurality of lanes generates a plurality of sets of lane features that correspond to the plurality of lanes;
applying an NN obstacle feature encoder to the moving obstacle to extract a set of obstacle features of the moving obstacle;
applying an NN environment feature encoder to the plurality of sets of lane features to generate a set of environment features;
predicting a second lane of the plurality of lanes that the moving obstacle will select by applying a lane selection predictive model to the plurality of sets of lane features, the set of obstacle features of the moving obstacle, and the set of environmental features,
planning a path of the ADV, based on the predicting of the second lane that the moving obstacle will select, to avoid collision with the moving obstacle; and
automatically operating a control system of the ADV to drive the ADV along the path.

18. The system of claim 17, wherein the lane selection predictive model produces the predicting of the second lane.

19. The system of claim 18, wherein the plurality of sets of lane features comprises:
a first set of lane feature corresponding to the first lane, the obstacle features, and the environment features; and
a second set of lane feature corresponding to the second lane, the obstacle features, and the environment features, wherein the first set of lane features is fed to a first input of inputs of the lane selection predictive model and the second set of lane features is fed to a second input of the inputs.

20. The system of claim 19, wherein the lane selection predictive model generates a first output having a first probability and a second output having a second probability indicating probabilities of selecting the first lane and the second lane respectively by the moving obstacle.

* * * * *